United States Patent
Chang et al.

(10) Patent No.: US 9,952,998 B2
(45) Date of Patent: Apr. 24, 2018

(54) THUNDERBOLT SHARING CONSOLE AND SWITCHING METHOD THEREOF

(71) Applicant: ATEN International Co., Ltd., New Taipei (TW)

(72) Inventors: Sheng-Chiang Chang, New Taipei (TW); Ting-Ju Tsai, New Taipei (TW); Chih-Wei Huang, New Taipei (TW); Hsiang-Jui Yu, Taoyuan (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 142 days.

(21) Appl. No.: 15/071,123

(22) Filed: Mar. 15, 2016

(65) Prior Publication Data

US 2017/0046297 A1 Feb. 16, 2017

(30) Foreign Application Priority Data

Aug. 10, 2015 (TW) .............................. 104212875 U

(51) Int. Cl.
G06F 13/36 (2006.01)
G06F 13/40 (2006.01)
G06F 13/42 (2006.01)

(52) U.S. Cl.
CPC ...... *G06F 13/4027* (2013.01); *G06F 13/4022* (2013.01); *G06F 13/4282* (2013.01)

(58) Field of Classification Search
CPC ............. G06F 13/4027; G06F 13/4022; G06F 13/4282
See application file for complete search history.

(56) References Cited

U.S. PATENT DOCUMENTS

| | | | |
|---|---|---|---|
| 9,081,909 B2* | 7/2015 | Chu ...................... | G06F 13/385 |
| 2012/0215950 A1* | 8/2012 | Anderson ............. | G06F 13/385 |
| | | | 710/33 |
| 2012/0284434 A1* | 11/2012 | Warren ............... | H04L 47/2441 |
| | | | 710/22 |
| 2013/0145071 A1* | 6/2013 | Chu ...................... | G06F 13/385 |
| | | | 710/313 |
| 2013/0318261 A1* | 11/2013 | Cheng .................. | G06F 13/385 |
| | | | 710/62 |
| 2013/0322455 A1* | 12/2013 | Tsai ........................ | H04L 12/56 |
| | | | 370/400 |
| 2014/0132835 A1 | 5/2014 | Ma | |
| 2015/0350014 A1* | 12/2015 | McKeever, II ..... | G06F 13/4022 |
| | | | 370/254 |
| 2016/0050375 A1* | 2/2016 | Soffer ................... | H04N 5/268 |
| | | | 348/445 |

FOREIGN PATENT DOCUMENTS

| | | |
|---|---|---|
| TW | 201351930 A | 12/2013 |
| TW | I461921 | 11/2014 |
| TW | I465919 | 12/2014 |

OTHER PUBLICATIONS

"Thunderbolt Technology" by Jason Ziller and Aviel Yogev, Intel Corporation, 2011.*

* cited by examiner

*Primary Examiner* — Jing-Yih Shyu
(74) *Attorney, Agent, or Firm* — Chen Yoshimura LLP

(57) ABSTRACT

A Thunderbolt sharing console includes a high speed switch electrically coupled to at least one Thunderbolt host, a MCU coupled to the high speed switch, and a Thunderbolt interface chip coupled to the high speed switch, wherein the MCU can be used to control the high speed switch for determining which one of the at least one Thunderbolt host is coupled to the Thunderbolt interface chip.

10 Claims, 5 Drawing Sheets

THUNDERBOLT SHARING CONSOLE AND SWITCHING METHOD THEREOF

BACKGROUND OF THE INVENTION

Field of the Invention

This invention relates to the field of electronics devices, and in particular, it relates to a Thunderbolt sharing console and switching method thereof.

Description of Related Art

Thunderbolt is a hardware connection interface standard developed by Intel. Thunderbolt technology uses two communication protocols, including PCI Express (Peripheral Component Interconnect Express, PCIe) for transmitting dada, and DisplayPort video standard interface for display, which is completely compatible with existing DisplayPort devices. Thunderbolt is a revolutionary I/O transmission technology; it allows users to transmit DisplayPort data and PCI Express data using a simple connection port. Thunderbolt provides two channels in the same connector, and data transmission speed in both directions can reach 10 Gb/s, even 20 Gb/s. The Thunderbolt data transmission speed between peripheral devices is faster than USB 2 by about 40 times, and faster than FireWire 800 by about 25 times.

Generally speaking, Thunderbolt is a PC I/O transmission interface used by, for example, Intel and Apple devices. It can serialize data via a Thunderbolt controller, and convert data to data for USB/audio/LAN/SATA and other interfaces.

SUMMARY

However, current Thunderbolt controllers cannot support two or more Thunderbolt hosts. This is a drawback of this technology.

Accordingly, the present invention is directed to a Thunderbolt sharing console that substantially obviates one or more of the problems due to limitations and disadvantages of the related art.

An object of the present invention is to provide a serial-connected Thunderbolt sharing console.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a Thunderbolt sharing console, which includes: a high speed switch, for coupling to at least two Thunderbolt hosts; a microprocessor unit, coupled to the high speed switch; and a Thunderbolt interface chip, coupled to the high speed switch, wherein the microprocessor unit controls the high speed switch to switch between the at least two Thunderbolt hosts.

In one aspect, each of the Thunderbolt hosts has a Thunderbolt interface.

In another aspect, the Thunderbolt sharing console includes a Thunderbolt connector, a PCIe connector and a video connector, for electrically coupling the thunderbolt interface chip to a Thunderbolt device, a PCIe device and a video device.

In another aspect, the present invention provides a Thunderbolt sharing console, which includes: a microprocessor unit (MCU); a first Thunderbolt interface chip for coupling to a first Thunderbolt host; a second Thunderbolt interface chip for coupling to a second Thunderbolt host; a high speed switch coupled to the MCU, the first Thunderbolt interface chip and the second Thunderbolt interface chip; a Peripheral Component Interconnect Express (PCIe) switch coupled to the MCU, the first Thunderbolt interface chip and the second Thunderbolt interface chip; and a video switch coupled to the MCU, the first Thunderbolt interface chip and the second Thunderbolt interface chip.

In another aspect, the MCU controls the high speed switch, the PCIe switch and the video switch to achieve Thunderbolt switching of the high speed switch, the PCIe switch and the video switch of the Thunderbolt sharing console.

In another aspect, the MCU controls the high speed switch, the PCIe switch and the video switch, to determine whether each of the high speed switch, the PCIe switch and the video switch is connected to the first Thunderbolt interface chip or the second Thunderbolt interface chip.

In another aspect, each of the first and second Thunderbolt hosts has a Thunderbolt interface.

In another aspect, the Thunderbolt sharing console includes a Thunderbolt connector, a PCIe connector and a video connector, for respectively electrically coupling the high speed switch, PCIe switch and video switch to a Thunderbolt device, a PCIe device and a video device.

It is to be understood that both the foregoing general description and the following detailed description are exemplary and explanatory and are intended to provide further explanation of the invention as claimed.

BRIEF DESCRIPTION OF THE DRAWINGS

The drawing figures are provided to illustrate embodiments of the present invention to aid in their understanding; they do not limit the scope of the invention.

DETAILED DESCRIPTION OF PREFERRED EMBODIMENTS

Embodiments of the present invention are described below. The structure and related method of the embodiments are described here; they are intended to explain the invention but not to limit its scope. Thus, in addition to the preferred embodiments described herein, the invention may be used in other embodiments.

Figure 1:
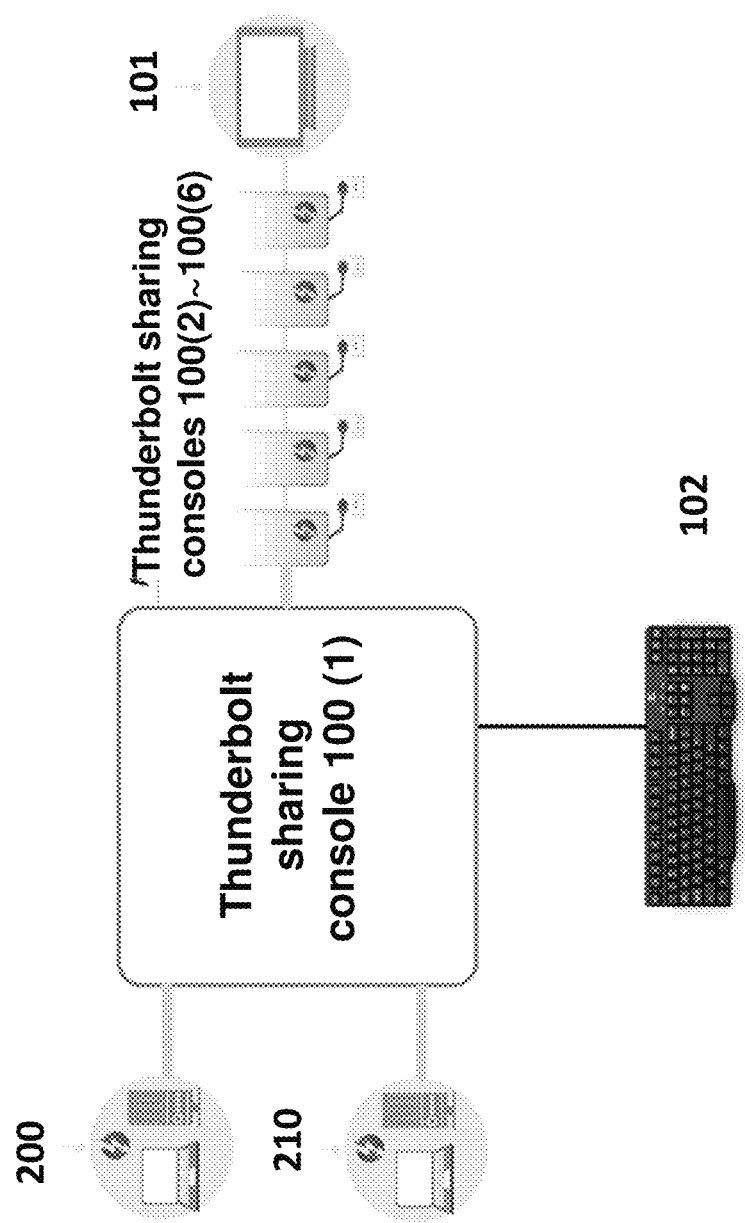
FIG. 1 illustrates a Thunderbolt system according to an embodiment of the present invention.

In the Thunderbolt switching technology described herein, the Thunderbolt host is typically a personal computer (PC). FIG. 1 illustrates a Thunderbolt system according to an embodiment of the present invention. Multiple Thunderbolt sharing consoles 100(1) and 100(2) to 100(6) can be connected in series to transmit data in series, as shown in FIG. 1. In this embodiment allows the user to connect two Thunderbolt hosts (Thunderbolt host PCs), and uses a switching method to select one of the hosts to communicate with; and hotkey commands from a keyboard 102 can be used to command the port switching. Using this embodiment, the user can connect two Thunderbolt hosts (Thunderbolt PCs) 200 and 210, and Thunderbolt's serial connection features can be used to connect multiple Thunderbolt sharing consoles in series; using the switching function, the user can more easily switch between two Thunderbolt hosts. Each of the serial connected Thunderbolt sharing console has multiple connectors (such as PCIe connector port), for connecting devices 101 (such as Thunderbolt devices, peripheral devices or video devices). The external end devices connected to the connectors of the Thunderbolt sharing console may also include, for example, external hard disk drive, display, communication network, etc. The Thunderbolt hosts may be, for example, notebook computers.

Figure 2:
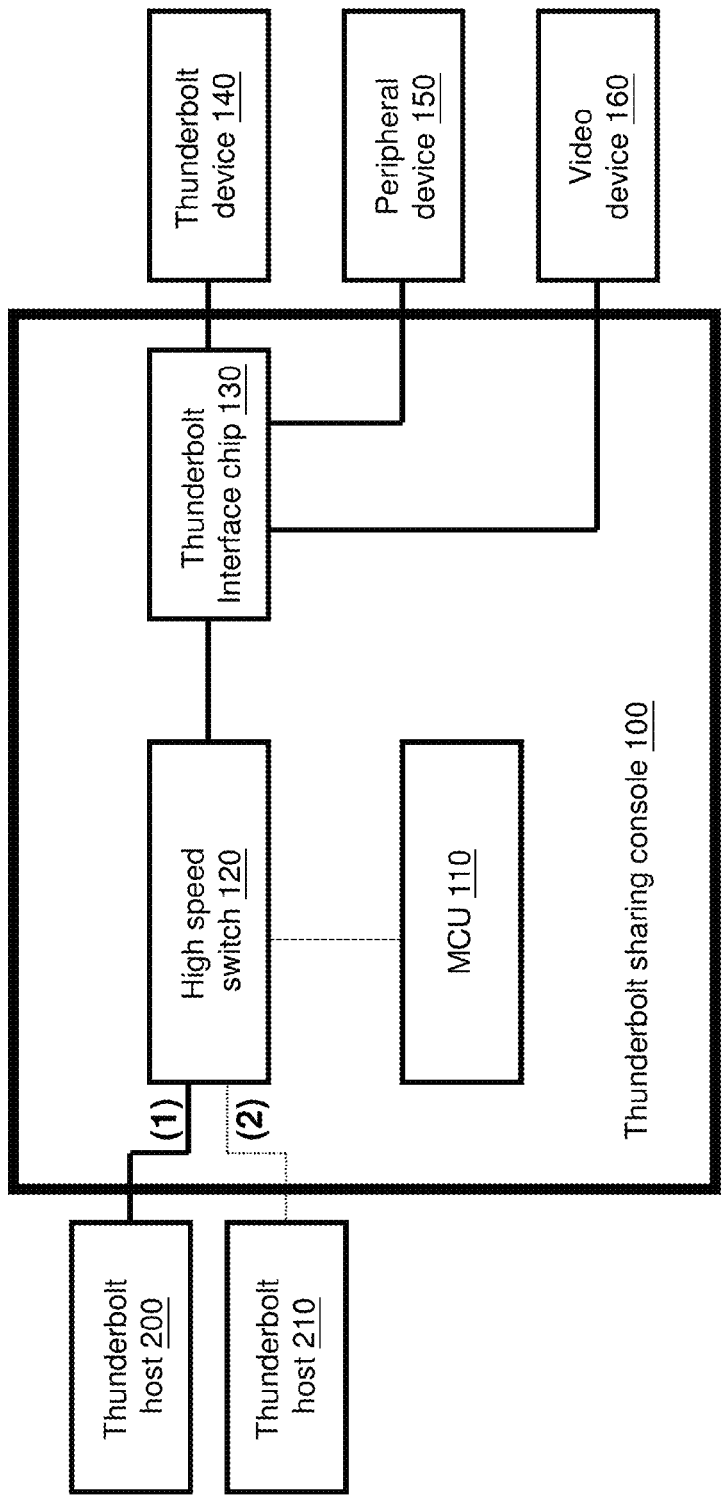
FIG. 2 is a block diagram of a Thunderbolt sharing console using front-end switching according to an embodiment of the present invention.

FIG. 2 is a block diagram of a Thunderbolt sharing console using front-end switching according to an embodiment of the present invention. In this embodiment, the system uses front-end switching to determine which one of the Thunderbolt hosts 200 and 210 to communicate to. The Thunderbolt hosts 200 and 210 are electrically coupled to the Thunderbolt sharing console 100. Each of the Thunderbolt hosts 200 and 210 has a Thunderbolt interface, for communicating with the Thunderbolt sharing console 100. The Thunderbolt sharing console 100 can perform Thunderbolt switching, so it is a Thunderbolt switching device. The Thunderbolt sharing console 100 includes a MCU 110, a high speed switch 120, and a Thunderbolt interface chip 130. The high speed switch 120 is electrically coupled to the MCU 110 and the Thunderbolt interface chip 130. The high speed switch 120 is electrically coupled to the Thunderbolt hosts 200 and 210. The high speed switch 120 performs Thunderbolt interface switching. The MCU 110 generate control signals for the high speed switch 120 (possible signals include GPIO, I2C, etc.)

Front-end switching of Thunderbolt hosts means that the high speed switch 120 of the Thunderbolt sharing console 100 is directly coupled to the Thunderbolt hosts 200 and 210, and the high speed switch 120 is directly used to switch between the Thunderbolt hosts 200 and 210. The Thunderbolt hosts 200 and 210 are both coupled to the same high speed switch 120. In one implementation, Thunderbolt switching can be accomplished using keyboard hotkey commands, to switch between the ports of the two Thunderbolt hosts 200 and 210 via the MCU 110.

The Thunderbolt sharing console 100 has a number of connectors, such as PCIe connectors, for connecting to Thunderbolt hosts 200 and 210, Thunderbolt device 140, peripheral device 150 and video device 160. The Thunderbolt interface chip 130 is electrically coupled to the Thunderbolt device 140, the peripheral device 150 and the video device 160. In one implementation, the Thunderbolt device 140, peripheral device 150 and video device 160 each has a PCIe connector. The peripheral device 150 may be any device connected on a PCIe bus, such as a USB (Universal Serial Bus) chip, a WLAN (Wireless Local Area Network) chip, a SATA (Serial AT Attachment) chip, an ESATA (External Serial AT Attachment) chip, etc. Thus, the electronic devices (the Thunderbolt hosts 200, 210) can be connected to the Thunderbolt sharing console 100 and connected to various peripheral devices 150. The Thunderbolt device 140 can be serially connect to other Thunderbolt devices or a DisplayPort out. The peripheral device 150 can provide USB, audio, LAN, SATA and other interfaces via the PCIe interface.

The MCU 110 controls the high speed switch 120 to determine which one of the Thunderbolt hosts 200 and 210 communicates with the Thunderbolt interface chip 130. When one of the Thunderbolt hosts 200 and 210 is communicating with the Thunderbolt sharing console 100, the other one deems itself to be not connected to any Thunderbolt devices. Thus, each time front-end switching occurs, the Thunderbolt host 200 or 210 needs to re-establish Thunderbolt interface communication. Front-end switching switches the signals at the Thunderbolt host end of the Thunderbolt sharing console 100.

Figure 3:
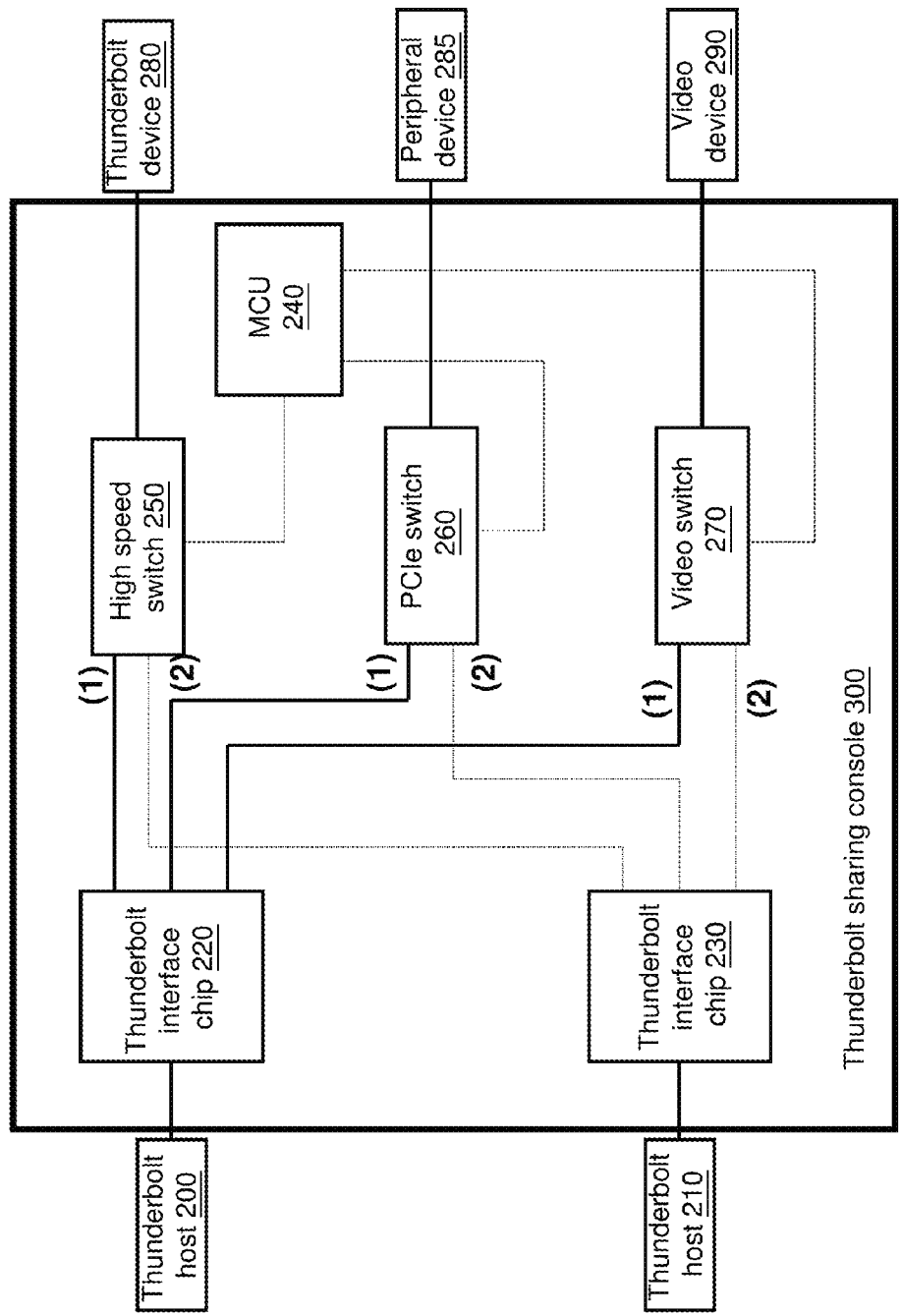
FIG. 3 is a block diagram of a Thunderbolt sharing console using synchronous back-end switching according to an embodiment of the present invention.

FIG. 3 is a block diagram of a Thunderbolt sharing console using synchronous back-end switching according to an embodiment of the present invention. In this embodiment, the system uses back-end switching to determine the communication with the Thunderbolt host 200 or 210. The Thunderbolt hosts 200 and 210 are electrically coupled to the Thunderbolt sharing console 300. The Thunderbolt sharing console 300 includes a Thunderbolt interface chip 220, a Thunderbolt interface chip 230, an MCU 240, a high speed switch 250, a PCIe switch 260, and a video switch 270. The Thunderbolt interface chips 220 and 230 are respectively coupled to the Thunderbolt hosts 200 and 210. The high speed switch 250 is electrically coupled to MCU 240, Thunderbolt interface chip 220, Thunderbolt interface chip 230 and Thunderbolt device 280. The PCIe switch 260 is electrically coupled to MCU 240, Thunderbolt interface chip 220, Thunderbolt interface chip 230 and peripheral device 285. The video switch 270 is electrically coupled to MCU 240, Thunderbolt interface chip 220, Thunderbolt interface chip 230 and video device 290. In this embodiment, the high speed switch 250 is not directly coupled to the Thunderbolt hosts 200 and 210. The MCU 240 controls the high speed switch 250, the PCIe switch 260 and the video switch 270.

Back-end switching means that the high speed switch of the Thunderbolt sharing console 300 is located at its back end and not directly coupled to the Thunderbolt hosts 200 and 210, and Thunderbolt switching occurs at the back end. In one implementation, Thunderbolt switching uses the keyboard hotkey commands, and the MCU 240 controls the high speed switch 250, PCIe switch 260 and video switch 270 of the Thunderbolt sharing console 300 to accomplish switching. The high speed switch 250 is used to switch the Thunderbolt interfaces of the Thunderbolt interface chips 220 and 230. The PCIe switch 260 is used to switch the downstream PCIe interfaces of the Thunderbolt interface chips 220 and 230. The video switch 270 is used to switch the downstream video interfaces (DP, HDMI, etc.) of the Thunderbolt interface chips 220 and 230. The Thunderbolt sharing console 300 has multiple connectors, such as PCIe connectors, for connecting to the Thunderbolt hosts 200 and 210, Thunderbolt device 280, peripheral device 285 and video device 290.

Figure 4:
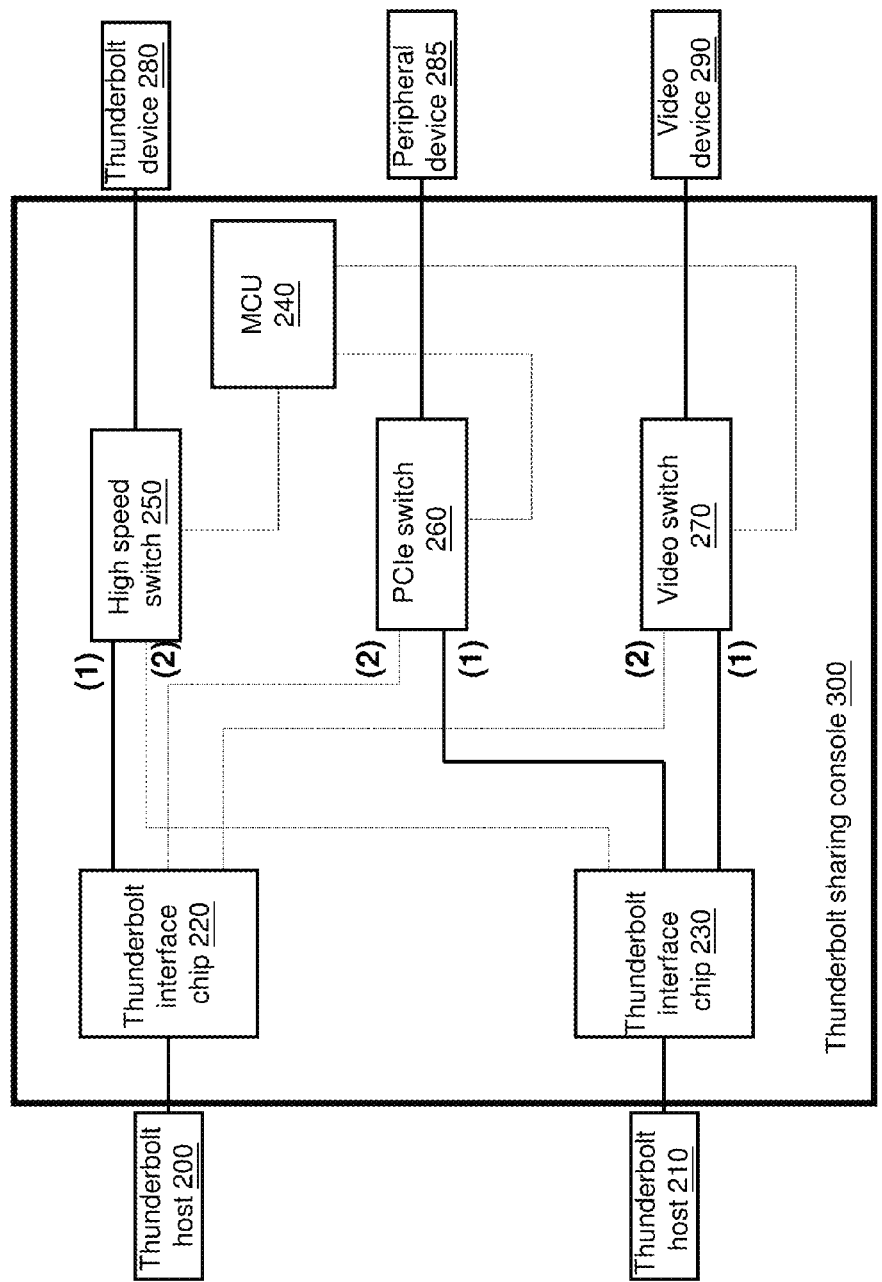
FIG. 4 is a block diagram of a Thunderbolt sharing console using asynchronous back-end switching according to an embodiment of the present invention.

Back-end Thunderbolt host switching includes synchronous and asynchronous modes, respectively shown in FIGS. 3 and 4. Refer to FIG. 3, which shows synchronous back-end switching of Thunderbolt hosts. In the back-end switching, the MCU 240 controls the high speed switch 250, PCIe switch 260, and video switch 270 to determine which one of the Thunderbolt hosts 200 and 210 communicates with the Thunderbolt sharing console 300. In synchronous back-end switching, the MCU 240 controls the high speed switch 250, PCIe switch 260, and video switch 270 to synchronously switch to one of the Thunderbolt interface chips 220 and 230. For example, in switching pattern (1), the high speed switch 250, PCIe switch 260, and video switch 270 are all switched to the Thunderbolt interface chip 220, and in switching pattern (2), the high speed switch 250, PCIe switch 260, and video switch 270 are all switched to the Thunderbolt interface chip 230. In other words, by synchronous switching, the high speed switch 250, PCIe switch 260, and video switch 270 are all switched to the same one of the Thunderbolt interface chips 220 and 230, whereby that one of the Thunderbolt hosts 200 and 210 communicates with the Thunderbolt sharing console 300. In this embodiment, when one of the Thunderbolt hosts 200 and 210 (e.g., Thunderbolt host 200) communicates with the Thunderbolt sharing console 300 and the related back-end peripheral devices, the other Thunderbolt host (e.g., Thunderbolt host 210) still recognizes that it is connected to a Thunderbolt interface chip (230), but cannot recognize or communicate with the related back-end devices connected to the Thunderbolt sharing console 300. Thus, in synchronous back-end switching, each time switching occurs, the Thunderbolt host only needs to re-establish the communication with the Thunderbolt PCIe downstream devices.

Refer to FIG. 4, which shows asynchronous back-end switching of Thunderbolt hosts. In the asynchronous back-end switching, the MCU 240 controls the high speed switch 250, PCIe switch 260, and video switch 270 to asynchronously switch to one of the Thunderbolt interface chips 220 and 230. For example, in switching pattern (1), the high speed switch 250 is switched to the Thunderbolt interface chip 220, while the PCIe switch 260 and video switch 270 are switched to the Thunderbolt interface chip 230; in switching pattern (2), the high speed switch 250 is switched to the Thunderbolt interface chip 230, while the PCIe switch 260 and video switch 270 are switched to the Thunderbolt interface chip 220. In other words, by asynchronous switching, the high speed switch 250, PCIe switch 260, and video switch 270 are independently switched to either one of the Thunderbolt interface chips 220 and 230, whereby each of the Thunderbolt hosts 200 and 210, via the respective Thunderbolt interface chips 220 and 230, communicates individually with the Thunderbolt device 280, the peripheral device 285 and the video device 290 independently of the other devices.

In asynchronous switching, the MCU 240 controls the high speed switch 250, PCIe switch 260 and video switch 270, to control each of the Thunderbolt hosts 200 and 210 to independently communicate with the peripheral device 285, video device 290 (e.g. monitor, display, etc.) or Thunderbolt device 280 which are connected to the Thunderbolt sharing console 300.

In one example, when one of the Thunderbolt hosts 200 and 210 (e.g., Thunderbolt host 200) communicates with the Thunderbolt device 280, and the other one of the Thunderbolt hosts 200 and 210 (e.g., Thunderbolt host 210) communicates with the peripheral device 285; the two Thunderbolt hosts 200 and 210 can independently communicate with and operate the relevant devices (the peripheral device 285, video device 290 (e.g. monitor, display, etc.) or Thunderbolt device 280).

Figure 5:
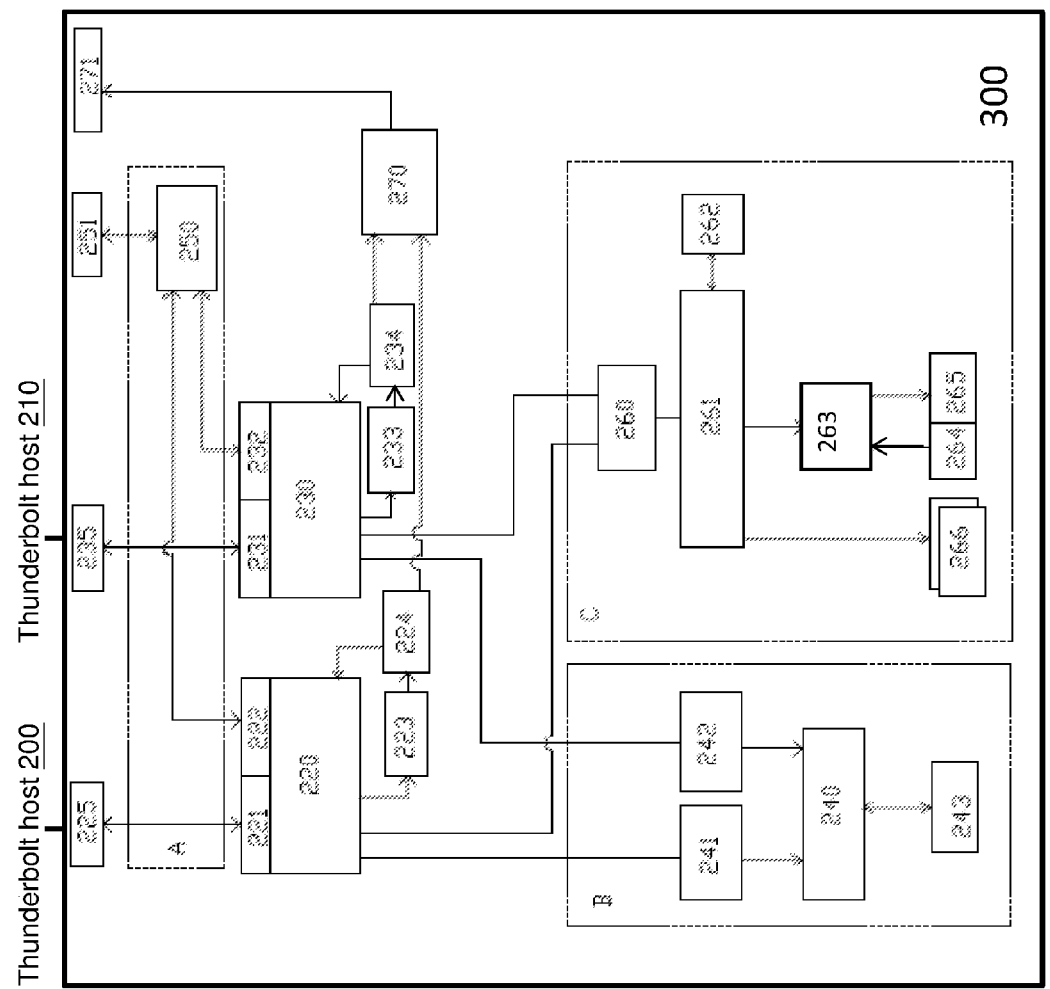
FIG. 5 is a block diagram of an exemplary Thunderbolt sharing console using back-end switching according to an embodiment of the present invention.

Refer to FIG. 5, which is a block diagram of an exemplary Thunderbolt sharing console using back-end switching according to an embodiment of the present invention. The device shown in FIG. 5 is based on the framework of the back-end switching Thunderbolt sharing console shown in FIGS. 3 and 4, with additional details about its structure and function; these details are provided to illustrate the embodiment of the invention without limiting the invention. The high speed switch 250 is coupled to the respective connection ports 222 and 232 of the Thunderbolt interface chips 220 and 230 to control their switching. Thunderbolt connectors 225 and 235 are respectively coupled to the connection ports 221 and 231 of the Thunderbolt interface chips 220 and 230; the Thunderbolt connectors 225 and 235 are for respectively electrically connecting to the Thunderbolt hosts 200 and 210. Further, the high speed switch 250 is coupled to a Thunderbolt connector 251 for electrically connecting to an external Thunderbolt device.

The Thunderbolt interface chips 220 and 230 are respectively electrically connected to DisplayPort converters 223 and 233 (such as model PS181 DP to DP++ converter). The DisplayPort converters 223 and 233 can receive source serial DisplayPort input and provide dual-mode DisplayPort output. The DisplayPort converters 223 and 233 are respectively coupled to DisplayPort demultiplexers 224 and 234 (such as model PS8338 DP Demux). The DisplayPort demultiplexer 224 is coupled to the Thunderbolt interface chip 220 and the video switch 270, and the DisplayPort demultiplexer 234 is coupled to the Thunderbolt interface chip 230 and the video switch 270. The video switch 270 (such as an HDMI switch) is coupled to a video connector 271 (such as an HDMI connector), for connecting to an external video device.

The PCIe switch 260 is coupled to a host controller chip 261 (such as model FL1100-EX USB chip), and the host controller chip 261 is coupled to a memory 262 (such as model 24LC16 EEPROM memory) and an audio chip 263 (such as model PCM2903 audio chip). The audio chip 263 is coupled to a cable input port 264 and a cable output port 265, for connecting to peripheral devices via cables. Further, the host controller chip 261 is also connected to a USB port 266 for connecting to USB peripheral devices.

The host controller chips 241 and 242 (such as model FL1100-EX USB chip) are respectively coupled to the Thunderbolt interface chips 220 and 230, and to the MCU chip 240 (such as model SICG8022 chip). The MCU 240 is coupled to connection port 243 for connecting to a keyboard and/or mouse. The PCIe switch 260 is also coupled to the Thunderbolt interface chips 220 and 230, for switching between the Thunderbolt interface chips 220 and 230.

In FIG. 5, as indicated by the dashed-line box A, this embodiment uses the high speed switch 250 to switch between the Thunderbolt hosts 200 and 210, and can keep all Thunderbolt functions (Thunderbolt in/DisplayPort out/Thunderbolt out). As indicated by the dashed-line box C, in this embodiment, the downstream PCIe interfaces of the Thunderbolt interface chips 220 and 230 are connected in series to the PCIe switch 260, so as to synchronously or asynchronously switch the peripheral devices of the Thunderbolt sharing console 300 between the Thunderbolt hosts 200 and 210. As indicated by the dashed-line box B, in this embodiment, the signal at another PCIe port can be converted to USB signal and coupled to MCU 240, to accomplish switching by keyboard hotkey commands.

In this embodiment, the MCU is used to control the high speed switch, PCIe switch and video switch, to determine which one of the Thunderbolt hosts communicates with the relevant peripheral device, monitor and Thunderbolt devices.

The Thunderbolt sharing console according to embodiments of the present invention has the following advantages:

(1) It allows the user to be connected to two Thunderbolt hosts, and can serially connect multiple Thunderbolt sharing consoles;

(2) It uses a high speed switch to switch between Thunderbolt hosts, while keeping all Thunderbolt functions (Thunderbolt in/DisplayPort out/Thunderbolt out);

(3) When switching between Thunderbolt hosts, the switching can be synchronous or asynchronous for the various external devices connected to the Thunderbolt sharing console;

(4) A PCIe port signal can be converted to USB signal and connected to the MCU, to accomplish port switching by keyboard hotkey command, as well as to convert Thunderbolt signal to signals for other types of peripheral connectors such as USB/audio/LAN.

It will be apparent to those skilled in the art that various modification and variations can be made in the Thunderbolt sharing console and related method of the present invention without departing from the spirit or scope of the invention. Thus, it is intended that the present invention cover modifications and variations that come within the scope of the appended claims and their equivalents.

What is claimed is:

1. A Thunderbolt sharing console, comprising:
   a high speed switch, for directly coupling to at least two Thunderbolt hosts using Thunderbolt interface and performing Thunderbolt interface switching among the Thunderbolt hosts,
   wherein each of the at least two Thunderbolt hosts includes a Thunderbolt interface;
   a microprocessor unit, coupled to the high speed switch;
   a Thunderbolt interface chip, coupled to the high speed switch,
   wherein the microprocessor unit controls the high speed switch to switch between the at least two Thunderbolt hosts;
   a Thunderbolt connector;
   a PCIe connector; and
   a video connector.

2. A Thunderbolt sharing console, comprising:
   a microprocessor unit;
   a first Thunderbolt interface chip, for coupling to a first Thunderbolt host, and having a Thunderbolt interface output, a Peripheral Component Interconnect Express (PCIe) interface output, and a video interface output;
   a second Thunderbolt interface chip, for coupling to a second Thunderbolt host, and having a Thunderbolt interface output, a PCIe interface output, and a video interface output;
   a high speed switch, coupled to the microprocessor unit, the Thunderbolt interface output of the first Thunderbolt interface chip and the Thunderbolt interface output of the second Thunderbolt interface chip, for switching between the Thunderbolt interface outputs of the first and second Thunderbolt interface chips;
   a Peripheral Component Interconnect Express (PCIe) switch, coupled to the microprocessor unit, the PCIe interface output of the first Thunderbolt interface chip and the PCIe interface output of the second Thunderbolt interface chip, for switching between the PCIe interface outputs of the Thunderbolt interface chips; and
   a video switch, coupled to the microprocessor unit, the video interface output of the first Thunderbolt interface chip and the video interface output of the second Thunderbolt interface chip, for switching between the video interface outputs of the first and second Thunderbolt interface chips.

3. The Thunderbolt sharing console of claim 2, wherein the microprocessor unit controls the high speed switch, PCIe switch and the video switch to switch each of them between the first Thunderbolt interface chip and the second Thunderbolt interface chip.

4. The Thunderbolt sharing console of claim 2, where the first Thunderbolt host includes a Thunderbolt interface.

5. The Thunderbolt sharing console of claim 2, where the second Thunderbolt host includes a Thunderbolt connector.

6. The Thunderbolt sharing console of claim 2, further comprising a Thunderbolt connector.

7. The Thunderbolt sharing console of claim 2, further comprising a PCIe connector.

8. The Thunderbolt sharing console of claim 2, further comprising a video connector.

9. The Thunderbolt sharing console of claim 3, wherein the microprocessor unit controls the high speed switch, PCIe switch and the video switch to switch each of them between the first Thunderbolt interface chip and the second Thunderbolt interface chip synchronously.

10. The Thunderbolt sharing console of claim 3, wherein the microprocessor unit controls the high speed switch, PCIe switch and the video switch to switch each of them between the first Thunderbolt interface chip and the second Thunderbolt interface chip asynchronously.

* * * * *